Patented Jan. 26, 1932

1,842,414

UNITED STATES PATENT OFFICE

JOSEPH M. F. LEAPER, OF BUFFALO, NEW YORK, ASSIGNOR TO NATIONAL ANILINE & CHEMICAL COMPANY, INC., OF NEW YORK, N. Y., A CORPORATION OF NEW YORK

PROCESS OF MAKING MERCAPTANS

No Drawing.   Application filed January 16, 1928.   Serial No. 247,269.

This invention relates to improvements in the production of aralkyl mercaptans, and more especially to a composition containing benzyl mercaptan.

It has been heretofore proposed to prepare benzyl mercaptan by treating an alcoholic solution of potassium hydrosulfide with benzyl chloride, subsequently adding water, allowing the mixture to stand, and separating the oily layer of benzyl mercaptan thus obtained.

According to the present invention, the production of benzyl mercaptan is accomplished by reacting benzyl chloride with sodium hydrosulfide in aqueous solution, preferably at a temperature below the boiling temperature of the mixture, and subsequently acidifying the mixture and separating the crude benzyl mercaptan thus obtained in any suitable manner. The invention will be further illustrated by the following specific example, but it will be understood that the invention is not limited thereto. The parts are by weight.

*Example.*—To 650 parts of a vigorously stirred aqueous solution containing 97.6 parts of sodium sulfide, cooled to about 0° to 5° C., there is slowly added, beneath the surface of the solution, 50° Bé. sulfuric acid until the mixture no longer immediately gives a pink color when a test portion is spotted on Clayton yellow test paper. During the addition of the acid, the temperature of the mixture is not allowed to rise above about 20° C. There is then added 121 parts of benzyl chloride, and the mixture is slowly heated, with continued stirring, to a temperature of about 75°–80° C. and maintained at this temperature for about 2 to 2.5 hours, or until the reaction is complete.

When the reaction is completed, the reaction-mixture is cooled to about 50° C. and about 120 parts of water and about 80 parts of 50° Bé. sulphuric acid are added. The mixture is agitated for about 10–20 minutes and then allowed to stand until it has separated into two liquid layers. The lower aqueous layer should react acid toward Congo red test paper, and if it does not, more acid should be added and the mixture again be allowed to stand. The upper layer, which comprises the crude benzyl mercaptan, is then separated by decantation or in any suitable manner. It may then, if desired, be stirred with dry, powdered sodium carbonate until it is substantially free from acid and subsequently separated therefrom by filtration or decantation.

The crude benzyl mercaptan (i. e. benzyl thioalcohol) thus obtained is a liquid immiscible with water and usually having a more or less yellow color. Generally about 80 percent, and sometimes even as much as about 90 percent, of the crude product boils within a range of about 175° to 220° C. In general, it contains about 75 to 90 percent of benzyl mercaptan, $C_6H_5CH_2SH$, and a considerable amount of benzyl monosulfide, $(C_6H_5CH_2)_2S$, for example, from about 5 or 8 to 20 percent. It may also contain a small amount of benzyl disulfide, $(C_6H_5CH_2)_2S_2$, and other organic impurities, e. g., benzyl chloride, etc. The amount of benzyl disulfide present will depend largely on the amount of benzyl chloride which may be present as an impurity in the benzyl chloride employed and also on the amount of oxidation which the benzyl mercaptan has undergone; but the amount of benzyl disulfide present from the latter source is ordinarily small.

If it is desired to separate benzyl mercaptan from the crude product, the latter may be treated with an aqueous solution of an alkali metal hydroxide, e. g., sodium hydroxide, to form the soluble alkali metal salt of the mercaptan, leaving the sulfides undissolved. The solution of the mercaptan salt may then be separated off and treated with acid to recover the mercaptan. Or the crude product may be subjected to fractional distillation and the benzyl mercaptan thereby obtained.

The production of the benzyl monosulfide is probably due to the presence of sodium sulfide in the reaction mixture. By the addition of sulfuric acid to the sodium sulfide solution there is formed sodium hydrosulfide. During the operation of the process, particularly at temperatures above about 50° C., some hydrogen sulfide is evolved and, in consequence, some sodium sulfide is probably reformed which probably reacts with the benzyl chloride to produce benzyl monosulfide; but it is to be understood that the benzyl monosulfide may be formed in some other manner.

In the above example, upon cooling the sodium sulfide solution more or less sodium sulfide may crystallize out, and upon the addition of sulfuric acid to the solution or suspension, the sodium sulfate which is formed may also more or less precipitate out, but these precipitates, if present, do no harm in the operation of the process or in subsequent steps of the process, and therefore they need not be removed.

It will be understood that the proportions of reagents employed as well as the conditions under which the reaction is carried out can be varied. For example, other alkali metal sulfides, such as potassium sulfide, may be used; and instead of preparing the hydrosulfide as a part of the process, the alkali metal hydrosulfide prepared in any manner may be taken as initial material; thus an aqueous solution of alkali metal hydrosulfide may be treated with benzyl chloride. Also, other acids such as hydrochloric acid may be used. Other aralkyl halides, such as benzyl bromide, may also be employed. Preferably, an excess, about 10 to 35 percent of sodium hydrosulfide over and above that theoretically required for reaction with the benzyl chloride is employed, but other proportions may be used. Further, the reaction may be carried out in aqueous media in conjunction with organic solvents, particularly those immiscible with water, such as toluene, etc. While the reaction between benzyl chloride and the sodium hydrosulfide will take place from room temperature to the boiling temperature (about 90° C.) of the reaction-mixture, the best temperature is above 50° C., preferably about 75° to 80° C. A pressure below, at, or above atmospheric pressure may be employed.

It will be understood that the process yields a variety of products depending upon the proportions and purity of reagents employed, and the conditions under which the process is carried out. In general, by careful manipulative control of proportions and conditions a composition containing about 85 percent, or even 90 percent, of benzyl mercaptan can be obtained. Besides benzyl mercaptan, the composition contains benzyl monosulfide, and may also contain benzyl disulfide and other polysulfides. Other proportions and conditions may yield a product containing about 50 percent of benzyl mercaptan or less and a corresponding increase in the amount of benzyl sulfides.

The process of the present invention is applicable to the preparation of other aralkyl mercaptans in a similar manner; for example, methylbenzyl mercaptan or chlorbenzyl mercaptan from methylbenzyl chloride or chlorbenzyl chloride, etc.

I claim:

1. In the production of an aralkyl mercaptan, the process which comprises reacting an aralkyl halide with an alkali metal hydrosulfide in aqueous solution.

2. In the production of an aralkyl mercaptan, the process which comprises reacting an aralkyl mono chloride with sodium hydrosulfide in the presence of water, and subsequently acidifying the reaction-mixture and separating the crude aralkyl mercaptan therefrom.

3. In the production of a composition of matter containing an aralkyl mercaptan, the process which comprises treating an aqueous solution of an alkali metal sulfide with an amount of acid sufficient to convert the alkali metal sulfide to the alkali metal hydrosulfide, adding an aralkyl mono halide to the mixture, heating the mixture to a reaction temperature, acidifying the mixture and recovering the crude aralkyl mercaptan.

4. In the production of a benzyl mercaptan, the process which comprises reacting a benzyl halide with an alkali metal hydrosulfide in aqueous solution.

5. In the production of a benzyl mercaptan, the process which comprises reacting a benzyl chloride with an alkali metal hydrosulfide in aqueous solution.

6. In the production of benzyl mercaptan, the process which comprises reacting benzyl chloride with sodium hydrosulfide in aqueous solution.

7. In the production of benzyl mercaptan, the process which comprises heating an aqueous mixture comprising benzyl chloride and an alkali metal hydrosulfide at a temperature of about 50°–90° C.

8. In the production of benzyl mercaptan, the process which comprises heating an aqueous solution of sodium hydrosulfide with less than the theoretical amount of benzyl chloride at a temperature of 75°–80° C.

9. In the production of benzyl mercaptan, the process which comprises slowly adding sulfuric acid at a temperature of about 0° to 20° C. to 650 parts of an aqueous solution containing 97.6 parts of sodium sulfide until the solution is neutral to Clayton yellow, adding 121 parts of benzyl chloride and maintaining the temperature at about 75°–80° C. until the reaction is complete, cooling the reaction mixture and acidifying it with dilute sulfuric acid, and separating the crude mercaptan.

In testimony whereof I affix my signature.

JOSEPH M. F. LEAPER.

CERTIFICATE OF CORRECTION.

Patent No. 1,842,414. Granted January 26, 1932, to

JOSEPH M. F. LEAPER.

It is hereby certified that error appears in the printed specification of the above numbered patent requiring correction as follows: Page 1, line 73, for the word "benzyl" read benzal; and that the said Letters Patent should be read with this correction therein that the same may conform to the record of the case in the Patent Office.

Signed and sealed this 29th day of March, A. D. 1932.

(Seal)

M. J. Moore,
Acting Commissioner of Patents.